(12) United States Patent
Suzuki et al.

(10) Patent No.: US 8,158,920 B2
(45) Date of Patent: Apr. 17, 2012

(54) PHOTOELECTRIC CONVERSION APPARATUS AND IMAGING SYSTEM

(75) Inventors: Satoshi Suzuki, Hiratsuka (JP); Akira Okita, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 479 days.

(21) Appl. No.: 12/490,560

(22) Filed: Jun. 24, 2009

(65) Prior Publication Data

US 2010/0007760 A1 Jan. 14, 2010

(30) Foreign Application Priority Data

Jul. 11, 2008 (JP) ................................. 2008-181986

(51) Int. Cl.
*H04N 5/225* (2006.01)
*H01L 27/14* (2006.01)

(52) U.S. Cl. ..................... 250/208.1; 348/294; 348/300; 348/301

(58) Field of Classification Search ............... 250/208.1, 250/221; 348/297, 308, 272, 294, 300, 301
See application file for complete search history.

(56) References Cited

U.S. PATENT DOCUMENTS

| | | | | |
|---|---|---|---|---|
| 6,798,453 | B1 | 9/2004 | Kaifu | 348/304 |
| 7,294,818 | B2 | 11/2007 | Matsuda et al. | 250/208.1 |
| 7,321,110 | B2 | 1/2008 | Okita et al. | 250/208.1 |
| 7,408,210 | B2 | 8/2008 | Ogura et al. | 257/233 |
| 7,456,880 | B2 | 11/2008 | Okita et al. | 348/243 |
| 7,460,162 | B2 | 12/2008 | Koizumi et al. | 348/294 |
| 7,466,003 | B2 | 12/2008 | Ueno et al. | 257/462 |
| 7,514,732 | B2 | 4/2009 | Okita et al. | 257/292 |
| 7,538,804 | B2 | 5/2009 | Okita et al. | 348/241 |
| 7,538,810 | B2 | 5/2009 | Koizumi et al. | 348/308 |
| 7,550,793 | B2 | 6/2009 | Itano et al. | 257/239 |
| 7,557,847 | B2 | 7/2009 | Okita et al. | 348/308 |
| 7,839,439 | B2 * | 11/2010 | Sato et al. | 348/241 |
| 2006/0157759 | A1 | 7/2006 | Okita et al. | 257/292 |
| 2008/0273093 | A1 | 11/2008 | Okita et al. | 348/220.1 |
| 2009/0033781 | A1 | 2/2009 | Okita et al. | 348/308 |
| 2009/0147117 | A1 | 6/2009 | Suzuki et al. | 348/294 |
| 2009/0218477 | A1 | 9/2009 | Okita et al. | 250/214 A |

FOREIGN PATENT DOCUMENTS

JP 11-150255 A 6/1999
JP 2003-051989 A 2/2003

* cited by examiner

*Primary Examiner* — Tony Ko
(74) *Attorney, Agent, or Firm* — Fitzpatrick, Cella, Harper & Scinto

(57) ABSTRACT

A photoelectric conversion apparatus comprises: a plurality of pixels; a signal line; a holding block; an output unit; and a control unit, wherein the control unit selectively operates the holding block in a first mode or a second mode, the first mode being a mode in which a first signal is held in a first holding unit and then transferred from the first holding unit to a second holding unit via a first impedance conversion unit, and in which a second signal is held in a third holding unit and then transferred from the third holding unit to a fourth holding unit via a second impedance conversion unit, and the second mode being a mode in which the first signal is transferred to the second holding unit via the first impedance conversion unit and the second signal is transferred to the fourth holding unit via the first impedance conversion unit.

9 Claims, 15 Drawing Sheets

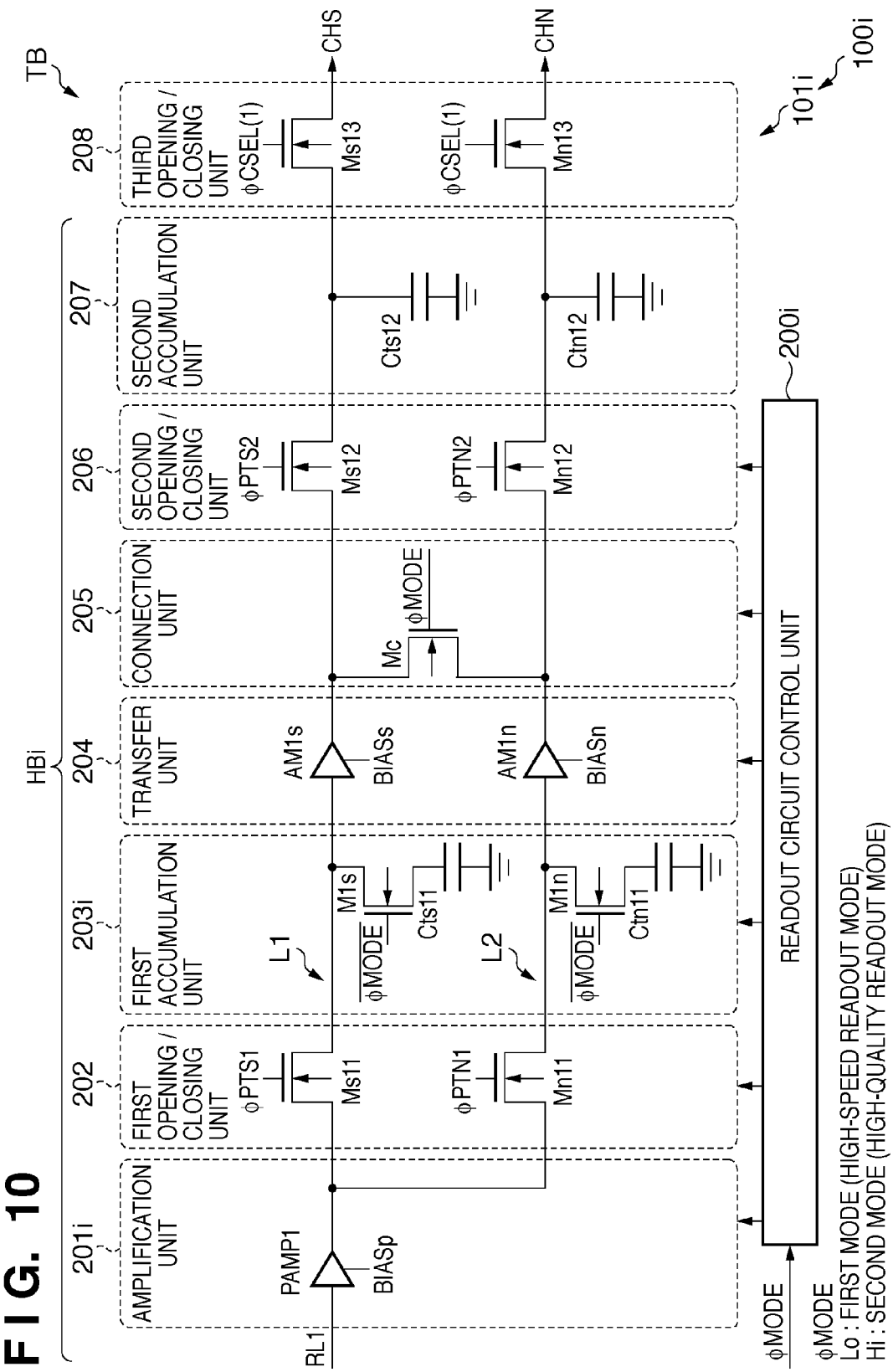

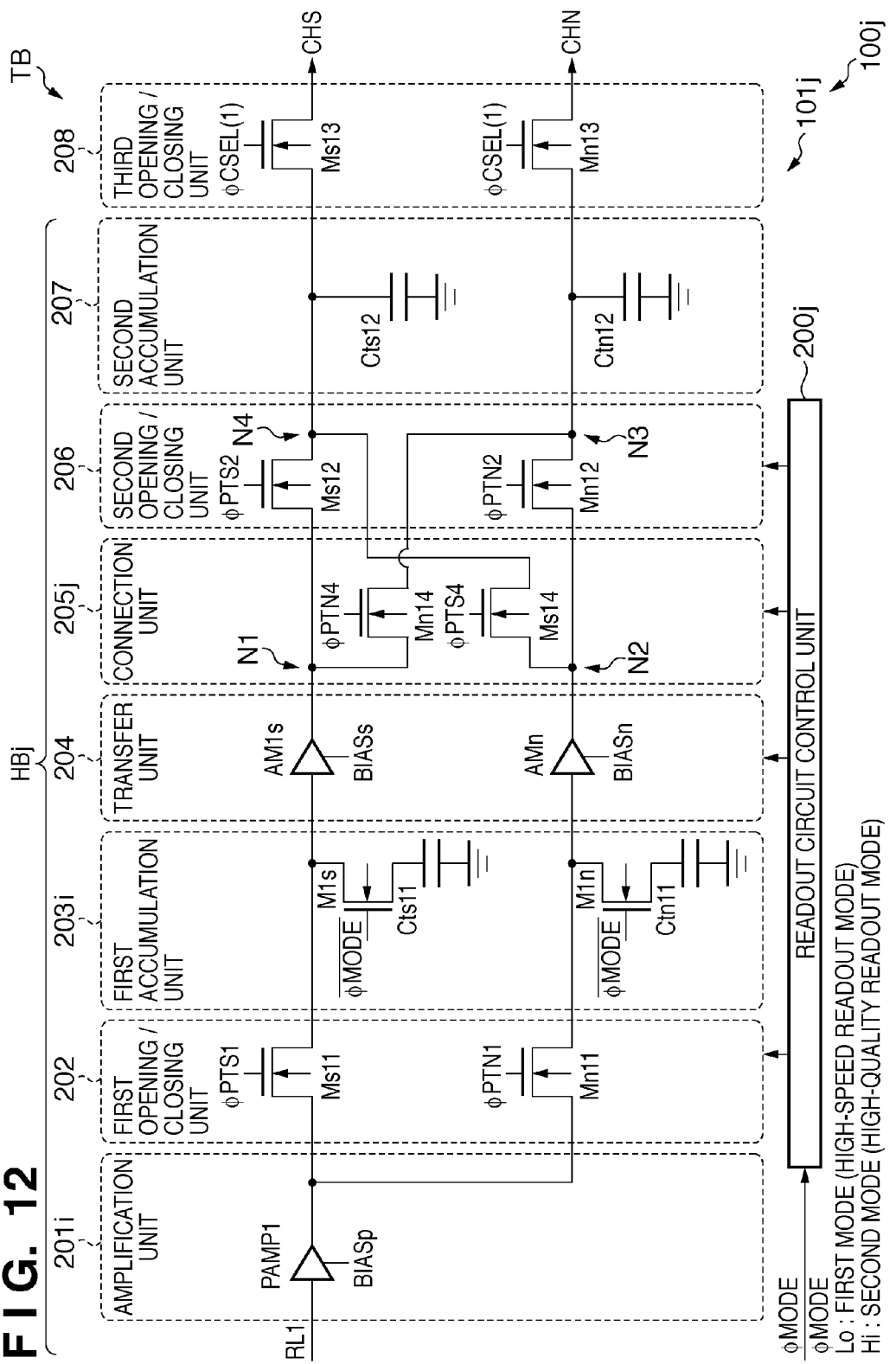

FIRST MODE (HIGH-SPEED READOUT MODE)

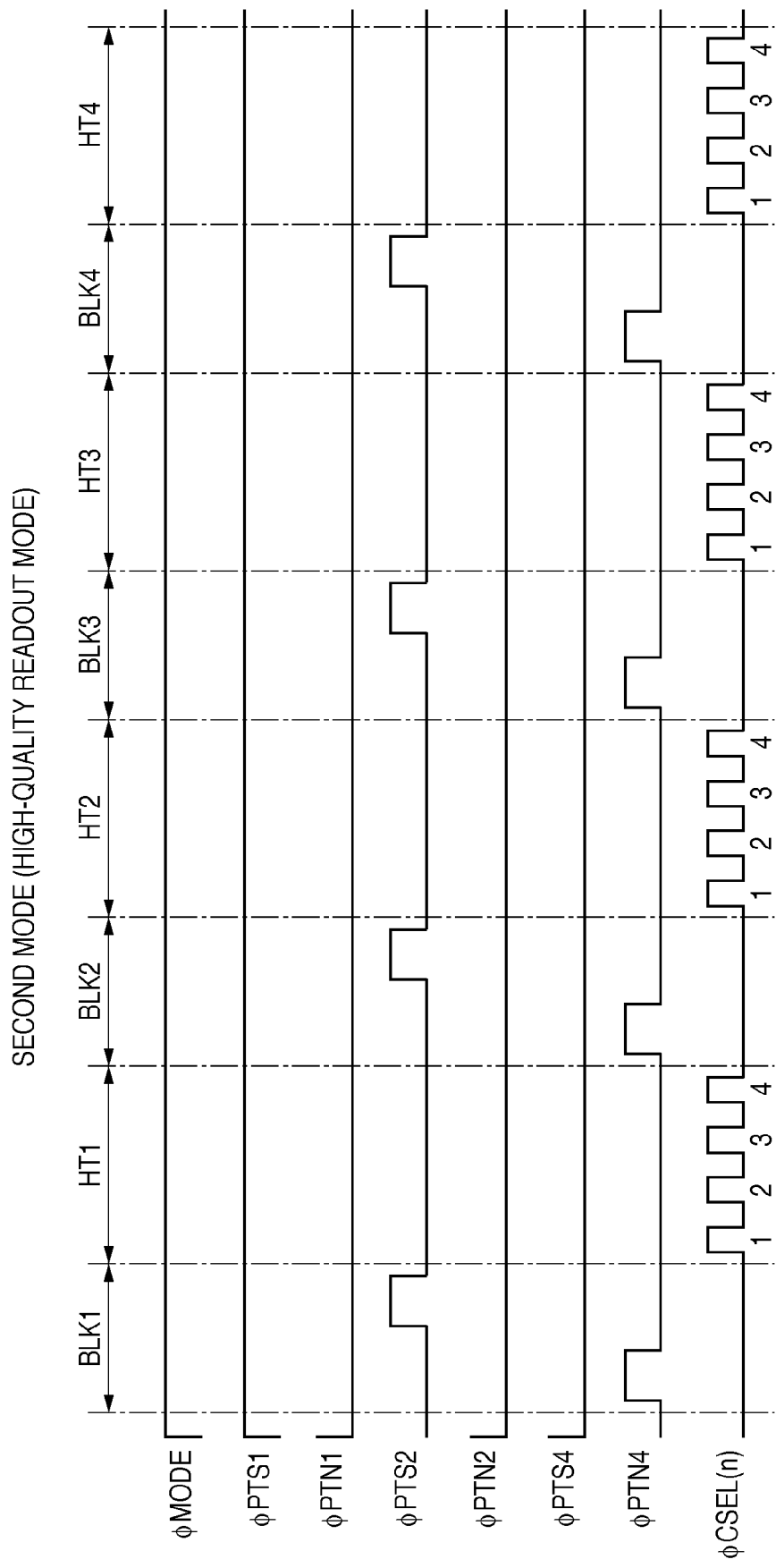

PHOTOELECTRIC CONVERSION APPARATUS AND IMAGING SYSTEM

BACKGROUND OF THE INVENTION

1. Field of the Invention

The present invention relates to a photoelectric conversion apparatus and imaging system.

2. Description of the Related Art

In an image sensing apparatus disclosed in Japanese Patent Laid-Open No. 11-150255, a capacitance C, amplifier 2, switch SW, capacitance Csh, and amplifier 5 are connected in an order named to a signal line SIG connected to pixels on each column in a pixel array, as shown in FIG. 2 of Japanese Patent Laid-Open No. 11-150255. In the image sensing apparatus, as shown in FIG. 3 of Japanese Patent Laid-Open No. 11-150255, a reset switch 1 resets the capacitance C in accordance with a reset signal rc. Then, a thin-film transistor T is turned on to transfer the signal of a photoelectric conversion element S to the capacitance C and store it in the capacitance C. When the switch SW is turned on in response to a pulse Smpl, the amplifier 2 amplifies the signal stored in the capacitance C. The amplified signal is transferred to the capacitance Csh in a sample-and-hold circuit 3 and stored in it. After the switch SW is turned off, the signal stored in the capacitance Csh is transferred to an A/D converter 7 when an analog multiplexer 4 selects terminal 4 in response to pulses ad0 to ad8. The A/D converter 7 A/D-converts the signal, and outputs the data to Dout. The arrangement described in Japanese Patent Laid-Open No. 11-150255 can easily increase the S/N ratio because while the switch SW is OFF, a signal stored in the capacitance Csh is free from the adverse effect of fluctuations of an analog voltage output from the amplifier 2.

In an image sensing apparatus disclosed in Japanese Patent Laid-Open No. 2003-51989, a noise signal and optical signal are read out from a pixel at different timings and undergo CDS processing to calculate their difference. The image sensing apparatus in Japanese Patent Laid-Open No. 2003-51989 can output an image signal in which fixed pattern noise is reduced.

User demands for imaging systems equipped with photoelectric conversion apparatuses include the first demand to increase the maximum number of shots per sec (frame speed) even if the image quality slightly degrades, and the second demand to improve the image quality even if the frame speed decreases. In this case, a photoelectric conversion apparatus may separately employ a high-speed operation circuit for satisfying the first demand and a noise reduction circuit for satisfying the second. However, this may lead to an increase in circuit scale of the photoelectric conversion apparatus.

SUMMARY OF THE INVENTION

The present invention provides a photoelectric conversion apparatus configured to selectively operate in a high-speed operation mode and noise reduction mode while suppressing an increase in circuit scale of the photoelectric conversion apparatus.

According to the first aspect of the present invention, there is provided a photoelectric conversion apparatus comprising: a plurality of pixels each including a photoelectric conversion unit; a signal line which is connected to the plurality of pixels; a holding block which, while a readout pixel is selected from the plurality of pixels, temporarily holds a first signal and a second signal output from the readout pixel to the signal line at different timings; an output unit which generates an image signal by calculating a difference between the first signal and the second signal held in the holding block and which outputs the generated image signal; and a control unit which controls the holding block, wherein the holding block includes a first holding unit, a second holding unit, a third holding unit, a fourth holding unit, a first impedance conversion unit, and a second impedance conversion unit, and the control unit selectively operates the holding block in one of a first mode and a second mode, the first mode being a mode in which the first signal is held in the first holding unit and then transferred from the first holding unit to the second holding unit via the first impedance conversion unit, and in which the second signal is held in the third holding unit and then transferred from the third holding unit to the fourth holding unit via the second impedance conversion unit, and the second mode being a mode in which the first signal is transferred to the second holding unit via the first impedance conversion unit and the second signal is transferred to the fourth holding unit via the first impedance conversion unit.

According to the second aspect of the present invention, there is provided an imaging system comprising: a photoelectric conversion apparatus according to the first aspect of the present invention; an optical system which guides light to a pixel array of the photoelectric conversion apparatus; and a signal processing unit which processes a signal output from the photoelectric conversion apparatus to generate image data.

The present invention can provide a photoelectric conversion apparatus configured to selectively operate in a high-speed operation mode and noise reduction mode while suppressing an increase in circuit scale of the photoelectric conversion apparatus.

Further features of the present invention will become apparent from the following description of exemplary embodiments with reference to the attached drawings.

BRIEF DESCRIPTION OF THE DRAWINGS

FIG. 10 is a circuit diagram showing the circuit arrangement of a readout circuit 101$i$ for one column in the second embodiment of the present invention;

FIG. 12 is a circuit diagram showing the circuit arrangement of a readout circuit 101$j$ for one column in the third embodiment of the present invention;

FIG. 14 is a timing chart showing the operation of the readout circuit in the second mode.

DESCRIPTION OF THE EMBODIMENTS

Figure 1:
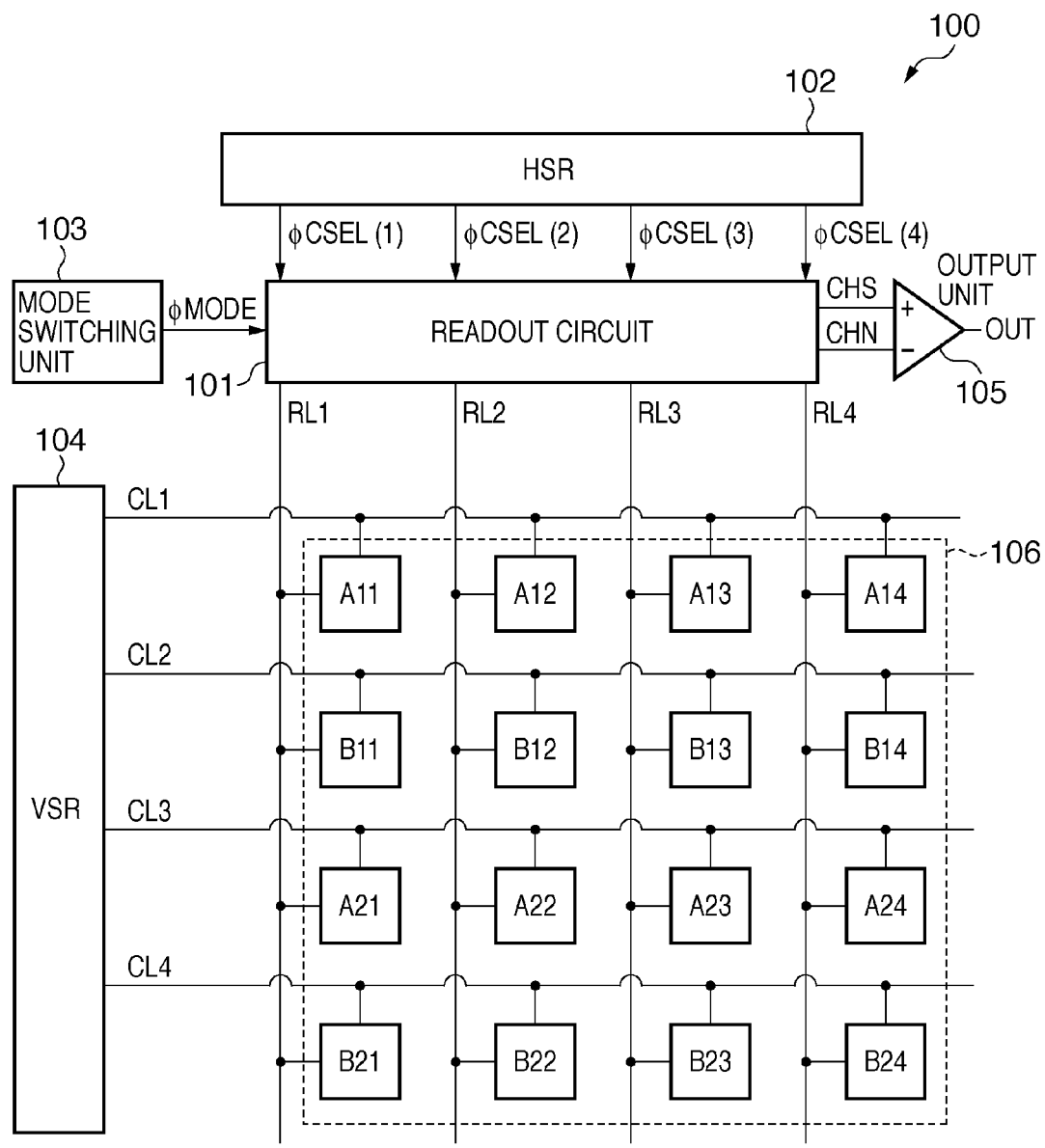
FIG. 1 is a block diagram of the arrangement of a photoelectric conversion apparatus 100 according to the first embodiment of the present invention.
Figure 2:
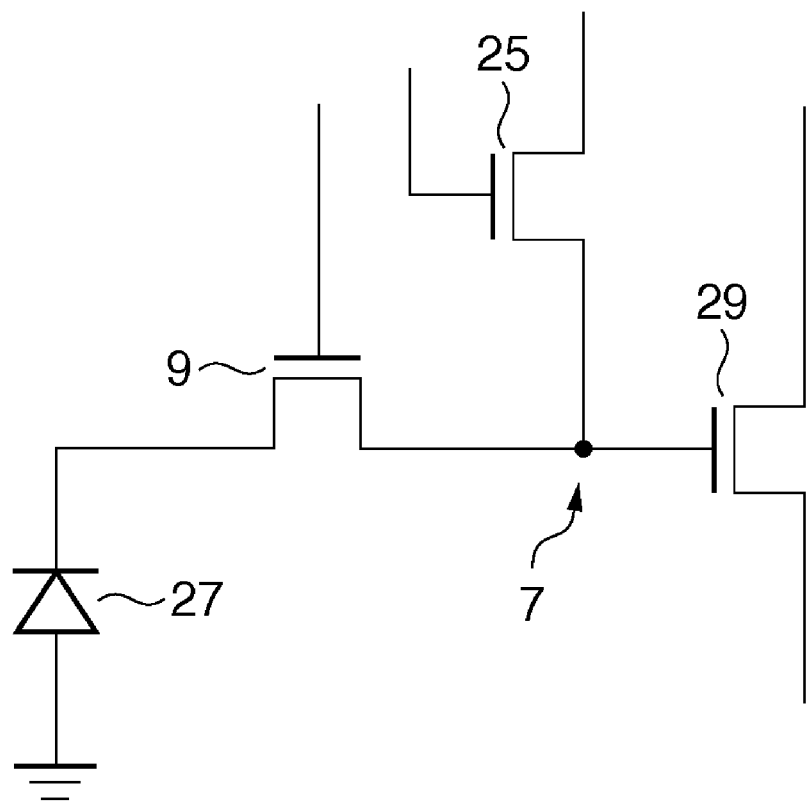
FIG. 2 is a circuit diagram showing the structure of a pixel A11 in the photoelectric conversion apparatus 100.

A photoelectric conversion apparatus 100 according to the first embodiment of the present invention will be described with reference to FIGS. 1 and 2. FIG. 1 is a block diagram of the arrangement of the photoelectric conversion apparatus 100 according to the first embodiment of the present invention. FIG. 2 is a circuit diagram of the structure of a pixel A11 in the photoelectric conversion apparatus 100.

For example, the photoelectric conversion apparatus 100 is a CMOS image sensor widely applied to an image input device for a video camera, digital still camera, and image scanner. Also, the photoelectric conversion apparatus 100 is a line sensor generally used in a photometer and distance measurement sensor.

The photoelectric conversion apparatus 100 includes a pixel array 106, vertical scanning circuit (VSR) 104, readout circuit 101, horizontal scanning circuit (HSR) 102, row control lines CL1 to CL4, and column signal lines RL1 to RL4. The photoelectric conversion apparatus 100 further includes a mode switching unit (control unit) 103, first horizontal output line (first output line) CHS, second horizontal output line (second output line) CHN, and output unit 105.

In the pixel array 106, a plurality of pixels A11 to B24 are arrayed two-dimensionally (directions along rows and columns). In the following example, the pixel array 106 is made up of 4×4 pixels A11 to B24 for descriptive convenience. In the pixel array 106, the pixels A11 to B24 may also be arrayed one-dimensionally.

As shown in FIG. 2, the pixel A11 includes a reset transistor 25, photoelectric conversion unit 27, transfer gate 9, floating diffusion (to be referred to as an FD hereinafter) 7, and amplification transistor 29. The reset transistor 25 resets the FD 7. The photoelectric conversion unit 27 generates charges corresponding to incident light by photoelectric conversion and stores them. The photoelectric conversion unit 27 is, for example, a photodiode. The transfer gate 9 transfers charges stored in the photoelectric conversion unit 27 to the FD 7. The FD 7 has a capacitance value and a potential of the FD 7 changes to a potential corresponding to the amount of charges transferred from the photoelectric conversion unit 27. The amplification transistor 29 outputs a signal corresponding to the potential of the FD 7 to the column signal line RL. The amplification transistor 29 receives the potential of the FD 7 and outputs a voltage signal to the column signal line RL1. While the FD 7 is reset, the amplification transistor 29 outputs a noise signal as the second signal to the column signal line RL1. While the photoelectric conversion unit 27 transfers charges to the FD 7, the amplification transistor 29 outputs an optical signal as the first signal to the column signal line RL1. A selection transistor may also be arranged to switch electrical connection/disconnection between the amplification transistor 29 and the column signal line RL1 such that the pixel A11 is in selected/deselected state. The selection transistor is controlled by, for example, a signal supplied from the vertical scanning circuit 104. As is apparent from the above description, the first and second signals are output from a readout circuit to the column signal line RL1 at different timings while a readout row (readout pixel) is selected.

The remaining pixels A12 to B24 also have the same structure as that of the pixel A11.

The vertical scanning circuit 104 scans the pixel array 106 vertically (in a direction along a column) to select and drive pixels of each row. For example, the vertical scanning circuit 104 supplies signals via the row control lines CL1 to CL4 to drive the pixels A11 to B24. More specifically, the vertical scanning circuit 104 selects a readout row (including a plurality of readout pixels) from the pixel array 106 to read out signals, and causes it to output signals to the column signal lines RL1 to RL4. The readout pixels on each readout row output signals to the column signal lines RL1 to RL4.

Upon receiving a predetermined instruction from an overall control/arithmetic unit 811 via a timing generator 808, the mode switching unit 103 controls the readout circuit 101 in a predetermined readout mode in accordance with the received instruction. For example, when the mode switching unit 103 receives an instruction to place importance on the readout speed (i.e. frame speed), it controls the readout circuit 101 in the first mode (high-speed readout mode) by changing a signal φMODE to be supplied to the readout circuit 101 to Lo level. For example, when the mode switching unit 103 receives an instruction to place importance on image quality, it controls the readout circuit 101 in the second mode (high-quality readout mode) by changing the signal φMODE to be supplied to the readout circuit 101 to Hi level.

The readout circuit 101 reads out optical signals serving as the first signals and noise signals serving as the second signals at different timings from readout pixels on each readout row via the column signal lines RL1 to RL4, and temporarily holds them for the respective columns. The readout circuit 101 operates in either the first or second mode in accordance with the signal φMODE supplied from the mode switching unit 103. Details of operations in the first and second modes will be described later.

The horizontal scanning circuit 102 scans the readout circuit 101 horizontally (in a direction along a row) to sequentially transfer the signals of respective columns from the readout circuit 101 to the first horizontal output line CHS and second horizontal output line CHN. The horizontal scanning circuit 102 sequentially activates signals φCSEL(1) to φCSEL(4) corresponding to the respective columns to sequentially transfer, to the first horizontal output line CHS and second horizontal output line CHN, the optical and noise signals of the respective columns that are held in the readout circuit 101.

The output unit 105 takes the difference between optical and noise signals transferred from the readout circuit 101 via the first horizontal output line CHS and second horizontal output line CHN, thereby generating and outputting an image signal.

Figure 3:
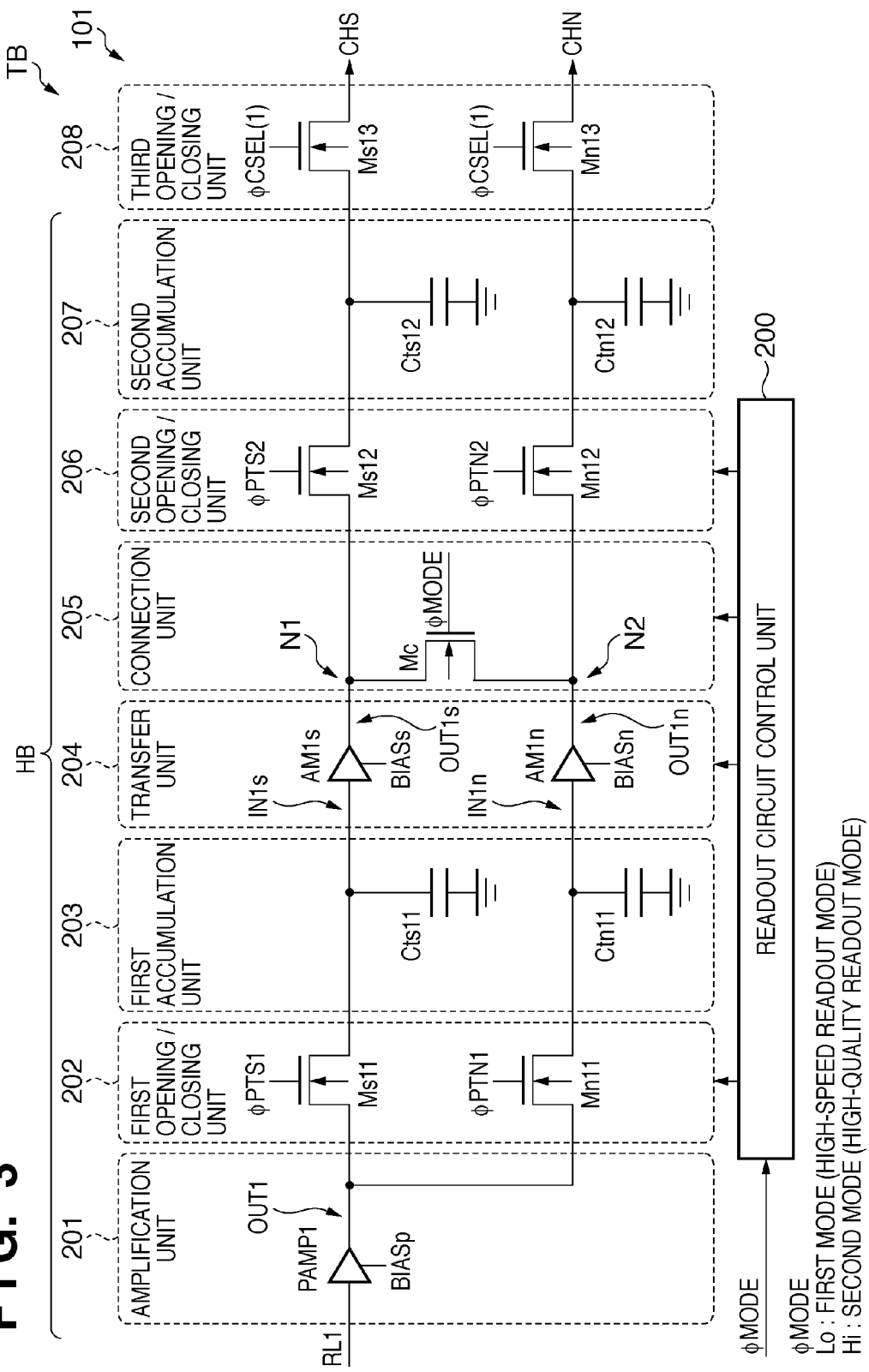
FIG. 3 is a circuit diagram showing the circuit arrangement of a readout circuit 101 for one column.

The arrangement of the readout circuit 101 will be explained with reference to FIG. 3. FIG. 3 is a circuit diagram showing the circuit arrangement of the readout circuit 101 for one column. FIG. 3 shows the connection between the column signal line RL1 and the readout circuit 101.

The readout circuit 101 includes, for each row of the pixel array 106, a holding block HB, column transfer unit TB, and readout circuit control unit 200, as shown in FIG. 3. Although the circuit arrangement of the readout circuit 101 for the column signal line RL1 is mainly explained hereinafter, the circuit arrangement for other column signal lines RL2 to RL4 is similar to the circuit arrangement for the column signal line RL1.

The holding block HB temporarily holds optical and noise signals received at different timings from a pixel via the column signal line RL1. The holding block HB includes an amplification unit 201, first opening/closing unit 202, first storage unit 203, transfer unit 204, second opening/closing unit 206, second storage unit 207, and connection unit 205.

The column transfer unit TB transfers optical and noise signals held in the holding block HB to the output unit 105. The column transfer unit TB includes a third opening/closing unit 208. The readout circuit control unit 200 controls the holding block HB in accordance with the signal φMODE supplied from the mode switching unit 103.

The amplification unit 201, first opening/closing unit 202, first storage unit 203, transfer unit 204, connection unit 205, second opening/closing unit 206, second storage unit 207, and third opening/closing unit 208 are connected in an order named to the column signal line RL1. The first horizontal output line CHS and second horizontal output line CHN (see FIG. 1) are connected on the subsequent stage of the third opening/closing unit 208.

The amplification unit 201 includes a preamplifier PAMP1 serving as a column amplifier. The preamplifier PAMP1 has an input terminal connected to the column signal line RL1 and an output terminal connected to an optical signal opening/closing portion Ms11 and noise signal opening/closing portion Mn11 (both of which will be described below). The amplification unit 201 amplifies an electrical signal output to the column signal line RL1, and transfers the amplified signal to the first opening/closing unit 202.

The first opening/closing unit 202 includes the optical signal opening/closing portion Ms11 serving as the first switch and the noise signal opening/closing portion Mn11 serving as the third switch. The first storage unit 203 includes an optical signal holding portion Cts11 serving as the first holding unit and a noise signal holding portion Ctn11 serving as the third holding unit. The optical signal opening/closing portion Ms11 connects/disconnects the column signal line RL1 to/from optical signal holding portion Cts11. The noise signal opening/closing portion Mn11 connects/disconnects the column signal line RL1 to/from noise signal holding portion Ctn11. The first storage unit 203 holds optical and noise signals output to the column signal line RL1.

The transfer unit 204 includes an optical signal buffer amplifier (first impedance conversion unit) AM1s and noise signal buffer amplifier (second impedance conversion unit) AM1n serving as impedance conversion units. The transfer unit 204 transfers signals held in the first storage unit 203 to the second storage unit 207.

The second opening/closing unit 206 includes an optical signal opening/closing portion Ms12 serving as the second switch and a noise signal opening/closing portion Mn12 serving as the fourth switch. The second storage unit 207 includes an optical signal holding portion Cts12 serving as the second holding unit and a noise signal holding portion Ctn12 serving as the fourth holding unit. The optical signal opening/closing portion Ms12 connects/disconnects the optical signal buffer amplifier AM1s to/from optical signal holding portion Cts12. The noise signal opening/closing portion Mn12 connects/disconnects the noise signal buffer amplifier AM1n to/from noise signal holding portion Ctn12. The second storage unit 207 holds optical and noise signals output from the transfer unit 204.

The third opening/closing unit 208 includes an optical signal opening/closing portion Ms13 serving as the eighth switch and a noise signal opening/closing portion Mn13 serving as the ninth switch. The optical signal opening/closing portion Ms13 connects/disconnects the optical signal holding portion Cts12 to/from first horizontal output line CHS. The noise signal opening/closing portion Mn13 connects/disconnects the noise signal holding portion Ctn12 to/from second horizontal output line CHN. For example, the optical signal opening/closing portion Ms13 electrically connects (in an ON state) the optical signal holding portion Cts12 to first horizontal output line CHS. For example, the noise signal opening/closing portion Mn13 electrically connects (in an ON state) the noise signal holding portion Ctn12 to second horizontal output line CHN.

The connection unit 205 includes a connection switch Mc serving as the fifth switch. The connection switch Mc connects/disconnects a first node N1 to/from second node N2. The first node N1 is a node between the optical signal buffer amplifier AM1s serving as the first impedance conversion unit and the optical signal opening/closing portion Ms12 serving as the second switch. The second node N2 is a node between the noise signal buffer amplifier AM1n serving as the second impedance conversion unit and the noise signal opening/closing portion Mn12 serving as the fourth switch.

The readout circuit control unit 200 controls the respective opening/closing units, transfer unit 204, and connection unit 205 in the readout circuit 101 in accordance with the signal φMODE supplied from the mode switching unit 103. For example, for control in the first mode (in a case where signal φMODE=Lo), the readout circuit control unit 200 maintains the connection switch Mc in the open state (OFF state). For example, for control in the second mode (in a case where signal φMODE=Hi), the readout circuit control unit 200 maintains the connection switch Mc in the closed state (ON state). The readout circuit control unit 200 is shared between the circuits of four columns connected to the column signal lines RL1 to RL4.

It should be noted that, in the circuit arrangement of one column as shown in FIG. 3, each opening/closing unit or the like may include an NMOS or PMOS transistor.

For control in the second mode, the readout circuit control unit 200 may also execute the following control. When transferring an optical signal to the optical signal holding portion Cts12, the readout circuit control unit 200 turns on the optical signal opening/closing portion Ms12, and at the same time turns off at least one of the noise signal opening/closing portion Mn12 or connection switch Mc. When transferring a noise signal to the noise signal holding portion Ctn12, the readout circuit control unit 200 turns on both of the noise signal opening/closing portion Mn12 and connection switch Mc, and turns off the optical signal opening/closing portion Ms12.

Figure 4A:
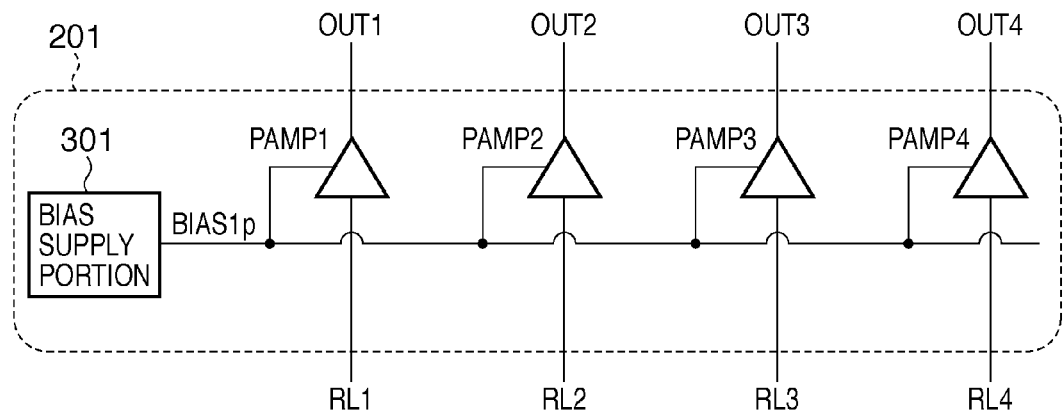
FIGS. 4A to 4C are circuit diagrams showing the structure of an amplification unit 201.
Figure 4B:
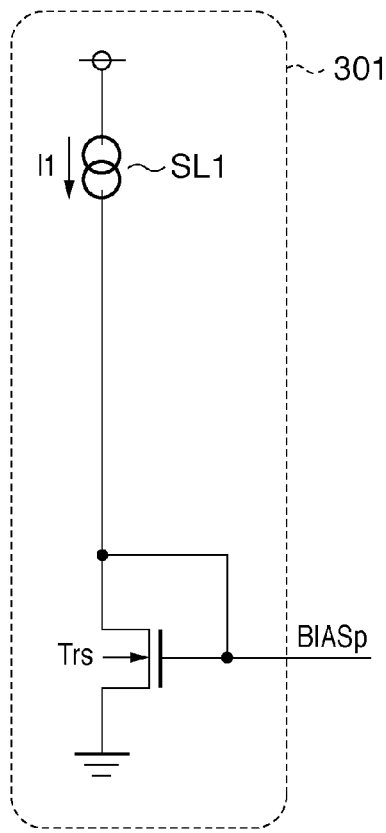
Figure 4C:
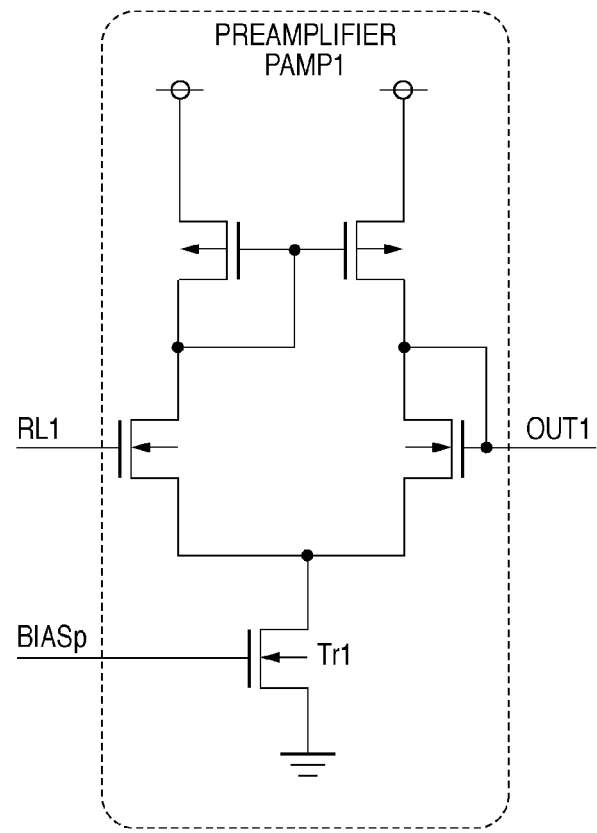

The structure of the amplification unit 201 will be explained with reference to FIGS. 4A to 4C. FIGS. 4A to 4C are circuit diagrams showing the structure of the amplification unit 201.

As shown in FIG. 4A, the amplification unit 201 includes a plurality of preamplifiers PAMP1 to PAMP4, and a bias supply portion 301 serving as the second supply unit. The preamplifiers PAMP1 to PAMP4 amplify signals transferred via the column signal lines RL1 to RL4, and output the amplified signals to output nodes OUT1 to OUT4, respectively. The bias supply portion 301 supplies a bias voltage to the preamplifiers PAMP1 to PAMP4.

As shown in FIG. 4B, the bias supply portion 301 includes a current source load SL1 and transistor Trs. The current source load SL1 supplies a current I1 to a drain of the transistor Trs. The transistor Trs has the drain and a gate both of which are short-circuited, and outputs a bias voltage corresponding to the current I1 from the gate (terminal BIASp).

As shown in FIG. 4C, the preamplifier PAMP1 is a differential amplifier having an inverting input terminal and output terminal both of which are short-circuited. The preamplifier PAMP1 receives a signal transferred via the column signal line RL1 at its non-inverting input terminal. The preamplifier PAMP1 amplifies the received signal at an amplification factor corresponding to the bias voltage supplied from the terminal BIASp to the gate of a load transistor Tr1. The preamplifier PAMP1 outputs the amplified signal to the output node OUT1.

The transistor Trs and load transistor Tr1 form a current mirror circuit. More specifically, the load transistor Tr1 supplies a current corresponding to (proportional to) the drain current of the transistor Trs into the preamplifier PAMP1. For example, when the drain current of the transistor Trs takes a predetermined value I1, the load transistor Tr1 supplies a predetermined current within the preamplifier PAMP1.

The embodiment adopts a 1×-gain amplifier for descriptive convenience, but may employ a circuit arrangement capable of setting an arbitrary gain instead.

Figure 5A:
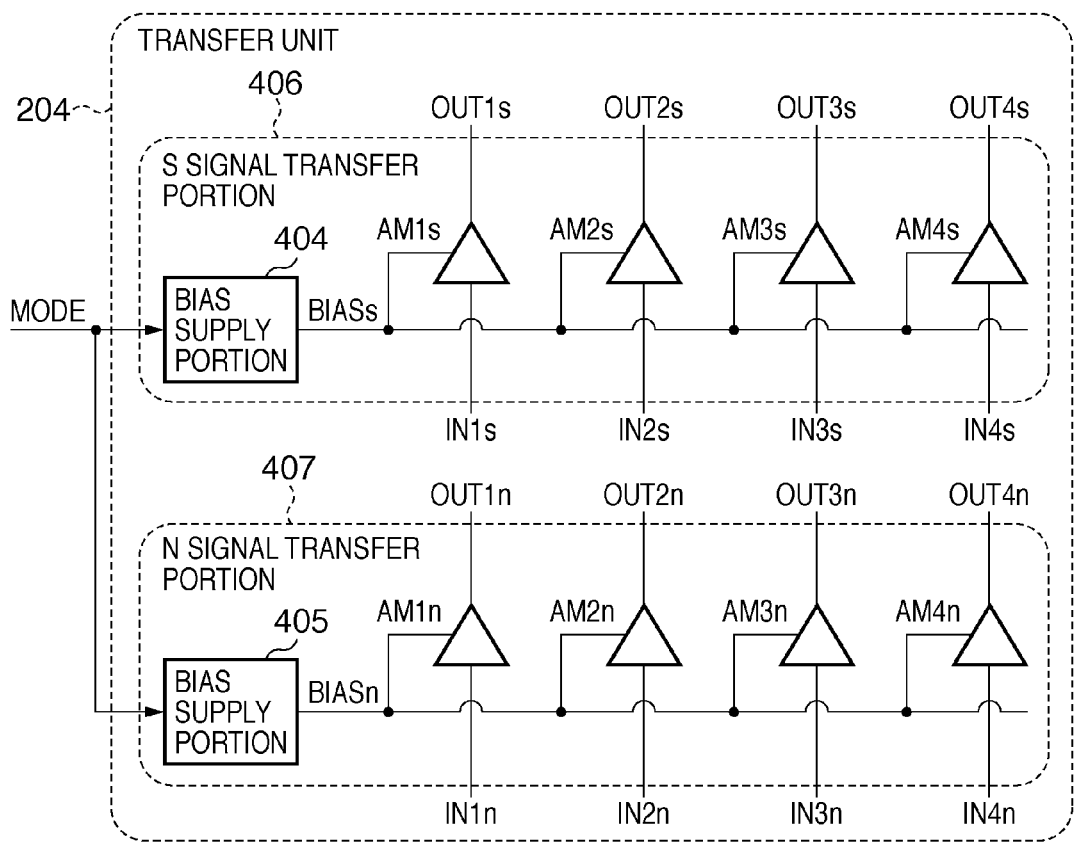
FIGS. 5A to 5C are circuit diagrams showing the structure of a transfer unit 204.
Figure 5B:
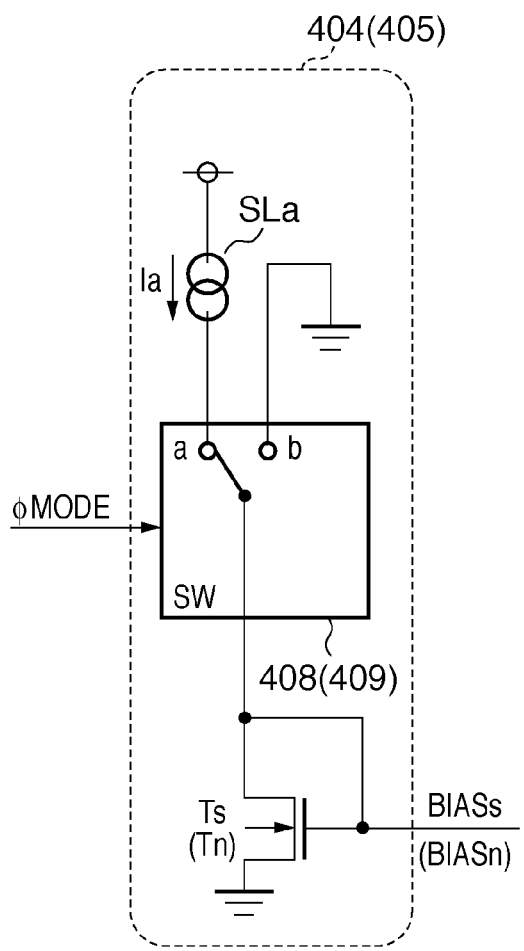
Figure 5C:
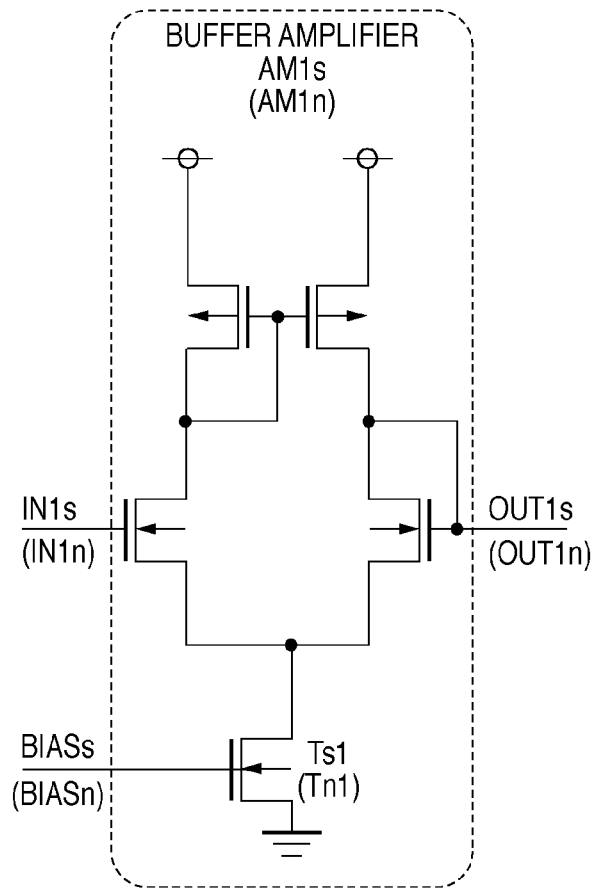

The structure of the transfer unit 204 will be described with reference to FIGS. 5A to 5C. FIGS. 5A to 5C are circuit diagrams showing the structure of the transfer unit 204.

As shown in FIG. 5A, the transfer unit 204 includes an S signal transfer portion 406 and N signal transfer portion 407.

The S signal transfer portion 406 includes a plurality of optical signal buffer amplifiers AM1s to AM4s, and a bias supply portion 404 serving as the first supply unit. The optical signal buffer amplifiers AM1s to AM4s of respective columns amplify signals transferred via input nodes IN1s to IN4s (see FIG. 3) of the respective columns, and output the amplified signals to output nodes OUT1s to OUT4s (see FIG. 3) of the respective columns. The bias supply portion 404 supplies a bias voltage to the optical signal buffer amplifiers AM1s to AM4s.

The N signal transfer portion 407 includes a plurality of noise signal buffer amplifiers AM1n to AM4n, and a bias supply portion 405 serving as the first supply unit. The noise signal buffer amplifiers AM1n to AM4n of respective columns amplify signals transferred via input nodes IN1n to IN4n (see FIG. 3) of the respective columns, and output the amplified signals to output nodes OUT1n to OUT4n (see FIG. 3) of the respective columns. The bias supply portion 405 supplies a bias voltage to the noise signal buffer amplifiers AM1n to AM4n.

As shown in FIG. 5B, the bias supply portion 404 includes a current source load SLa, current switch 408, and transistor Ts. The current switch 408 is connected to a terminal a regardless of the signal ϕMODE. The current switch 408 supplies a current Ia from the current source load SLa to the drain of the transistor Ts. The transistor Ts has a drain and gate both of which are short-circuited, and outputs a bias voltage corresponding to the current Ia from its gate (terminal BIASs).

As shown in FIG. 5B, the bias supply portion 405 includes a current source load SLa, current switch 409, and transistor Tn. In the first mode in which the signal ϕMODE is at Lo, the current switch 409 is switched to a terminal a to supply the current Ia from the current source load SLa to the drain of the transistor Tn. The transistor Tn has a drain and gate both of which are short-circuited, and outputs a bias voltage corresponding to the current Ia from its gate (terminal BIASn). In the second mode in which the signal ϕMODE is at Hi, the current switch 409 is switched to a terminal b to supply a ground voltage from a ground power supply to the drain of the transistor Tn. Then, the transistor Tn is turned off not to output a bias voltage.

As shown in FIG. 5C, the optical signal buffer amplifier AM1s is a differential amplifier having an inverting input terminal and output terminal both of which are short-circuited. The buffer amplifier AM1s receives a signal transferred via the input node IN1s at its non-inverting input terminal. The buffer amplifier AM1s amplifies the received signal at an amplification factor corresponding to the bias voltage supplied from the terminal BIASs to the gate of a load transistor Ts1. The buffer amplifier AM1s outputs the amplified signal to the output node OUT1s.

The transistor Ts and load transistor Ts1 form a current mirror circuit. More specifically, the load transistor Ts1 supplies a current corresponding to (proportional to) the drain current of the transistor Ts into the buffer amplifier AM1s. For example, when a drain current of the transistor Ts is Ia, the load transistor Ts1 supplies a current corresponding to the current Ia within the buffer amplifier AM1s.

Figure 6:
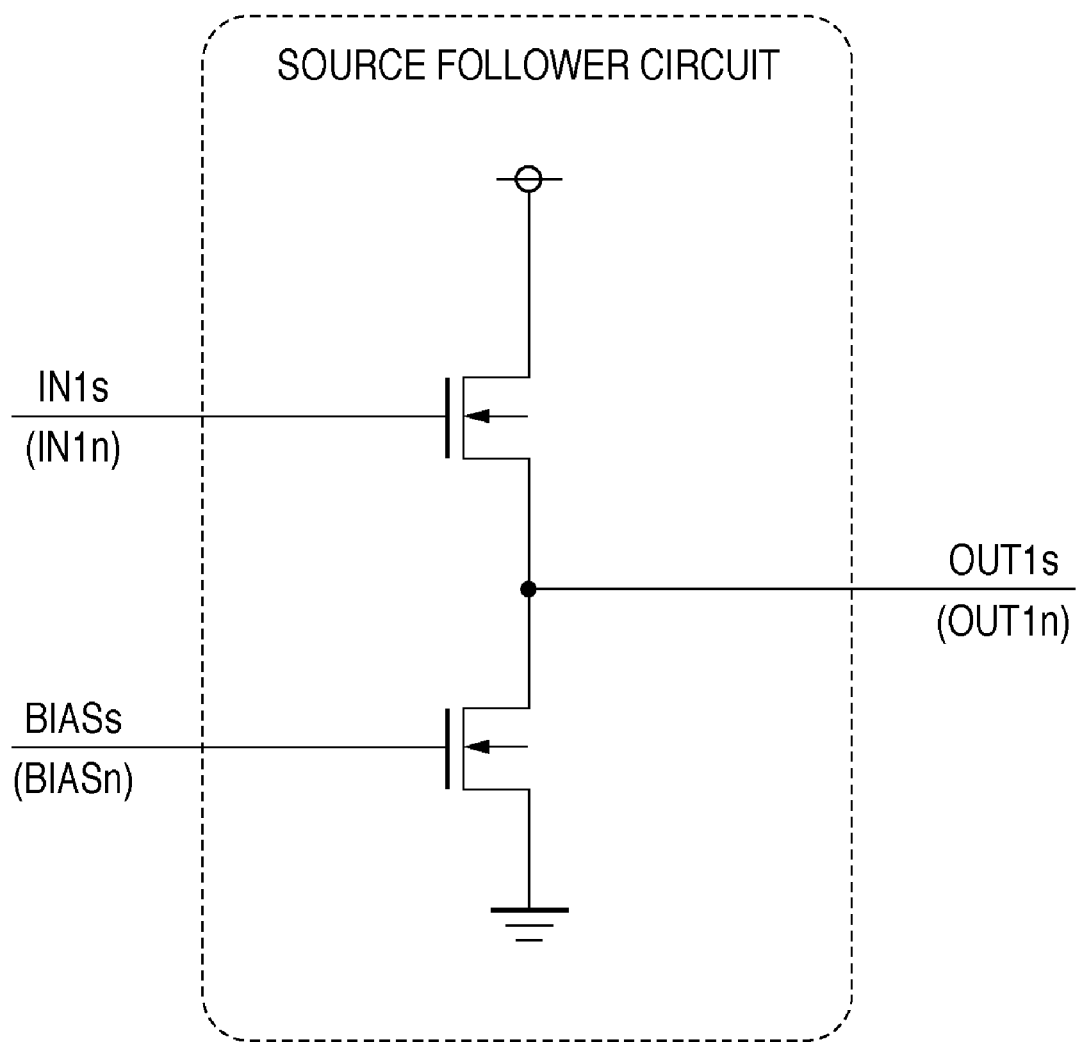
FIG. 6 is a circuit diagram of the structure of a source follower circuit in a modification to the first embodiment of the present invention.

The transfer unit 204 may include a plurality of source follower circuits (see FIG. 6) instead of a plurality of buffer amplifiers AM1s to AM4s.

As shown in FIG. 5C, the noise signal buffer amplifier AM1n is a differential amplifier having an inverting input terminal and output terminal both of which are short-circuited. The buffer amplifier AM1n receives a signal transferred via the input node IN1n at its non-inverting input terminal. The buffer amplifier AM1n amplifies the received signal at an amplification factor corresponding to the bias voltage supplied from the terminal BIASn to the gate of a load transistor Tn1. The buffer amplifier AM1n outputs the amplified signal to the output node OUT1n.

The transistor Tn and load transistor Tn1 form a current mirror circuit. More specifically, the load transistor Tn1 supplies a current corresponding to (proportional to) the drain current of the transistor Tn into the buffer amplifier AM1n. For example, when a drain current of the transistor Tn is Ia, the load transistor Tn1 supplies a current corresponding to the current Ia within the buffer amplifier AM1n.

It should be noted that the transfer unit 204 may include a plurality of source follower circuits (see FIG. 6) instead of a plurality of buffer amplifiers AM1n to AM4n.

Figure 7:
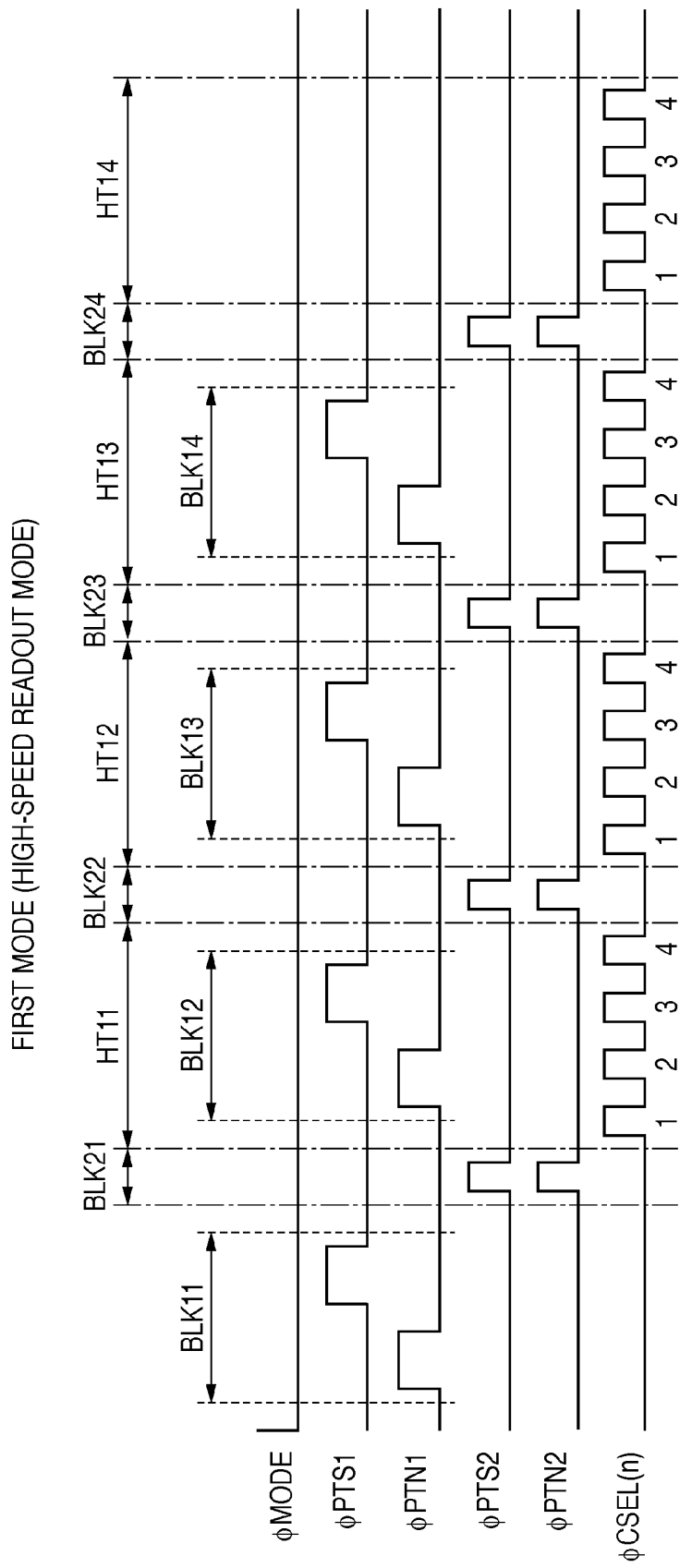
FIG. 7 is a timing chart showing the operation of the readout circuit in the first mode.
Figure 8:
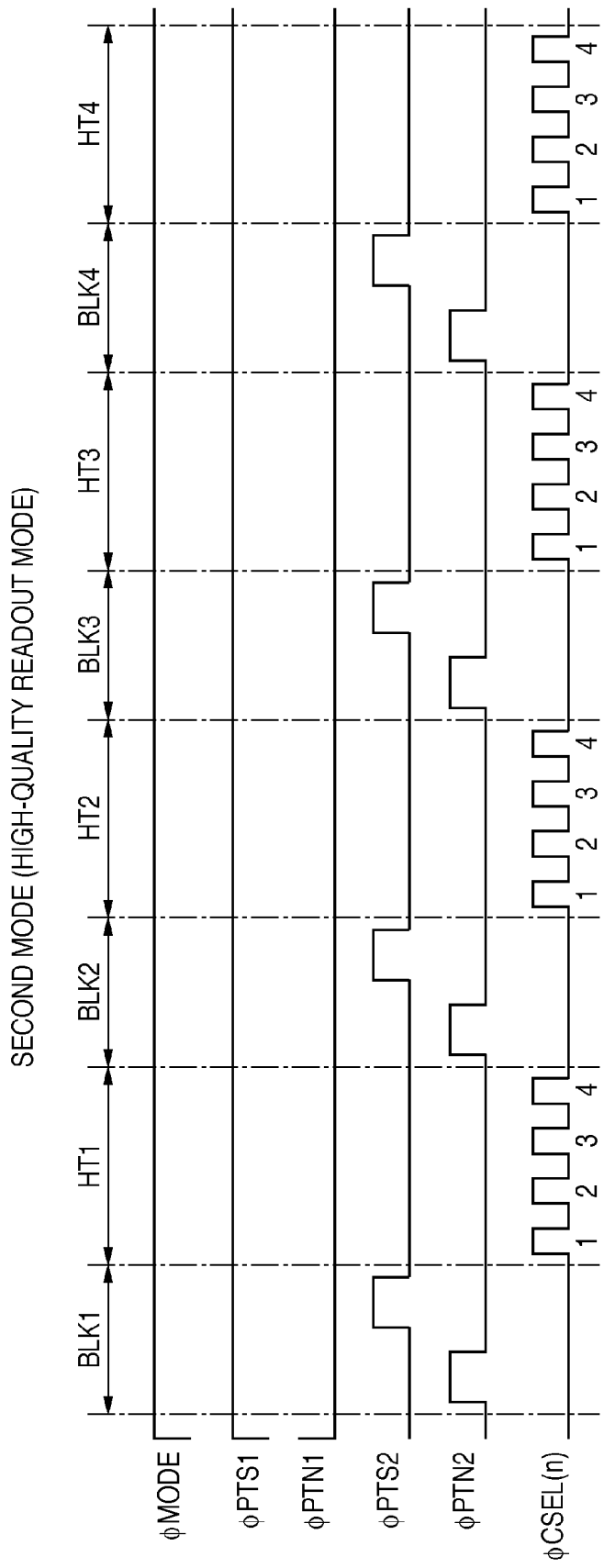
FIG. 8 is a timing chart showing the operation of the readout circuit in the second mode.

The operation of the readout circuit 101 will be explained with reference to FIGS. 7 and 8. FIGS. 7 and 8 are timing charts showing the operation of the readout circuit. FIGS. 7 and 8 show a case where a signal becomes active at high level. The operations in a case where a signal becomes active at low level, are similar except that all signal levels are logically inverted.

FIG. 7 is a timing chart showing the operation of the readout circuit in the first mode (the high-speed readout mode).

The mode switching unit 103 switches to the first mode by changing the signal ϕMODE to be supplied to the readout circuit control unit 200 to Lo level. The readout circuit control unit 200 generates driving pulses corresponding to the first mode for the first opening/closing unit 202, transfer unit 204, connection unit 205, and second opening/closing unit 206.

While a signal ϕPTN1 becomes active in a period BLK11, the opening/closing portion Mn11 is closed to transfer a noise signal, which has been output from the first pixel A11 to the column signal line RL1, via the amplification unit 201 into the noise signal holding portion Ctn11 to store the noise signal in the noise signal holding portion Ctn11. The noise signal contains, for example, an offset component unique to a pixel shown in FIG. 2, and random noise generated when the reset transistor 25 is turned on to reset the FD.

While a signal ϕPTS1 becomes active in the period BLK11, the opening/closing portion Ms11 is closed to transfer an optical signal, which has been output from the first pixel A11 to the column signal line RL1, via the amplification unit 201 into the optical signal holding portion Cts11 to store the optical signal in the optical signal holding portion Cts11. The above-mentioned noise signal is superimposed to the optical signal held in the holding portion Cts11. That is, the first storage unit 203 stores both the optical and noise signals output from the first pixel A11 to the column signal line RL1.

While signals φPTS2 and φPTN2 become active in a period BLK21, the opening/closing portions Mn12 and Ms12 are closed. Then, the optical signal buffer amplifier AM1s reads out the optical signal of the first pixel A11 from the optical signal holding portion Cts11, and transfers it to the optical signal holding portion Cts12. Similarly, the noise signal buffer amplifier AM1n reads out the noise signal of the first pixel A11 from the noise signal holding portion Ctn11, and transfers it to the noise signal holding portion Ctn12. That is, the transfer unit 204 reads out the signals of the first pixel A11 from the first storage unit 203, and transfers them to the second storage unit 207.

In a horizontal transfer period HT11, the horizontal scanning circuit 102 sequentially activates signals φCSEL(1) to φCSEL(4) corresponding to the respective columns to sequentially close the opening/closing portions of the third opening/closing unit 208 for the respective columns.

For example, while the signal φCSEL(1) for the column signal line RL1 becomes active, the opening/closing portions Ms13 and Mn13 are closed to read out the optical and noise signals of the first pixel A11 from the second storage unit 207.

More specifically, the optical signal of the first pixel A11 is read out from the optical signal holding portion Cts12 to the first horizontal output line CHS. The optical signal of the first pixel A11 is transferred to the output unit 105 via the first horizontal output line CHS. The noise signal of the first pixel A11 is read out from the noise signal holding portion Ctn12 to the second horizontal output line CHN. The noise signal of the first pixel A11 is transferred to the output unit 105 via the second horizontal output line CHN.

The output unit 105 takes the difference between an optical signal transferred via the first horizontal output line CHS and a noise signal transferred via the second horizontal output line CHN, and outputs the difference between them as an image signal to a subsequent stage. As described above, an optical signal transferred via the first horizontal output line CHS contains a noise signal. A difference signal output from the output unit 105 is a signal in which the noise signal is reduced.

While the signal φPTN1 becomes active in a period BLK12 during the horizontal transfer period HT11, the opening/closing portion Mn11 is closed to transfer a noise signal, which has been output from the second pixel B11 to the column signal line RL1, via the amplification unit 201 into the noise signal holding portion Ctn11 to store the noise signal in the noise signal holding portion Ctn11. The noise signal contains, for example, an offset component unique to a pixel shown in FIG. 2, and random noise generated when the reset transistor 25 is turned on to reset the FD 7.

While the signal φPTS1 becomes active in the period BLK12, the opening/closing portion Ms11 is closed to transfer an optical signal, which has been output from the second pixel B11 to the column signal line RL1, via the amplification unit 201 into the optical signal holding portion Cts11 to store the optical signal in the optical signal holding portion Cts11. The above-mentioned noise signal is superimposed to the optical signal held in the holding portion Cts11.

More specifically, an operation to store, in the first storage unit 203, optical and noise signals output from the second pixel B11 to the column signal line RL1 are executed in parallel with an operation to read out the optical and noise signals of the first pixel A11 to the output unit 105. A suffix "11" makes it clear that a signal transferred from the readout circuit 101 to the output unit 105 in the horizontal transfer period HT11 is one read out from a pixel to the readout circuit 101 in the period BLK11.

While the signals φPTS2 and φPTN2 become active in a period BLK22 subsequent to the horizontal transfer period HT11, the opening/closing portions Mn12 and Ms12 are closed. The optical signal buffer amplifier AM1s reads out the optical signal of the second pixel B11 from the optical signal holding portion Cts11, and transfers it to the optical signal holding portion Cts12. Similarly, the noise signal buffer amplifier AM1n reads out the noise signal of the second pixel B11 from the noise signal holding portion Ctn11, and transfers it to the noise signal holding portion Ctn12.

The operation is similarly performed in periods HT12, BLK23, HT13, BLK24, and HT14.

The signals shown in FIG. 7 also apply to the remaining column signal lines RL2 to RL4 except for the horizontal scanning signal φCSEL(n). As for the horizontal scanning signal φCSEL(n), after the signal φCSEL(1) for the column signal line RL1 becomes active, signals φCSEL(2) to φCSEL(4) for the remaining column signal lines RL2 to RL4 sequentially become active.

The period BLK21 during which signals stored in the first storage unit 203 are transferred to the second storage unit 207 is shorter than the period BLK11 during which signals are read out from the first pixel A11 to the first storage unit 203. Also, the period BLK22 during which signals stored in the first storage unit 203 are transferred to the second storage unit 207 is shorter than the period BLK12 during which signals are read out from the second pixel B11 to the first storage unit 203. This is because the region of the readout circuit 101 is smaller than that of the pixel array 106. The time taken for a signal to be transmitted through the region of the readout circuit 101 is shorter than that taken for it to be transmitted through the region of the pixel array 106. In some cases, the region of the pixel array 106 is several mm to several ten mm long.

In the first mode, the readout time can be shortened by executing, during the horizontal transfer period, the readout operation from a pixel to the first storage unit 203 that requires a long time.

FIG. 8 is a timing chart showing the operation of the readout circuit in the second mode (the high-quality readout mode). A difference from the operation in the first mode will be mainly explained.

The mode switching unit 103 switches to the second mode by changing the signal φMODE to be supplied to the readout circuit control unit 200 to Hi level. The readout circuit control unit 200 generates driving pulses corresponding to the second mode for the first opening/closing unit 202, transfer unit 204, connection unit 205, and second opening/closing unit 206.

Upon switching to the second mode, the readout circuit control unit 200 turns on the connection switch Mc to electrically connect the first node N1 to the second node N2. The readout circuit control unit 200 maintains the signal φPTS1 at Hi level and the signal φPTN1 at Lo level. The bias supply portion 405 (see FIG. 5A) stops supply of a bias voltage to the noise signal buffer amplifiers AM1n to AM4n.

While the signal φPTN2 becomes active in a period BLK1, the opening/closing portion Mn12 is closed to transfer a noise signal, which has been output from the first pixel A11 to the column signal line RL1, via the amplification unit 201, optical signal buffer amplifier AM1s, and connection unit 205 into the noise signal holding portion Ctn12 to store the noise signal in the noise signal holding portion Ctn12. The noise signal contains, for example, an offset component unique to a pixel shown in FIG. 2, and random noise generated when the reset transistor 25 is turned on to reset the FD 7.

While the signal φPTS2 becomes active in the period BLK1, the opening/closing portion Ms12 is closed to transfer an optical signal, which has been output from the first pixel A11 to the column signal line RL1, via the amplification unit 201 and optical signal buffer amplifier AM1s into the optical signal holding portion Cts12 to store the optical signal in the optical signal holding portion Cts12. The above-mentioned noise signal is superimposed to the optical signal held in the holding portion Cts12.

That is, the second opening/closing unit 206 stores optical and noise signals output from the first pixel A11 to the column signal line RL1 via the single buffer amplifier AM1s.

A horizontal transfer period HT1 is different from the horizontal transfer period HT11 of the first mode in that no operation is performed in parallel with the operation to read out the optical and noise signals of the first pixel A11 to the output unit 105. In the horizontal transfer period HT1, the optical and noise signals of the first pixel A11 are read out to the output unit 105.

In a period BLK2 subsequent to the horizontal transfer period HT1, the first storage unit 203 stores the optical and noise signals of the second pixel B11 that are output to the column signal line RL1.

In other words, the operation to read out signals and the operation to store them, which are parallelly executed in the first mode, are performed in series in the second mode without temporally overlapping each other.

For descriptive convenience, the switch Mc serving as the fifth switch is kept ON in the second mode. However, it is not always necessary to keep the switch Mc ON in the second mode. The switch Mc may be turned off when transferring the optical signal (the first signal) to the holding portion Cts12 and the switch Mc may be turned on when transferring the noise signal (the second signal) to the holding portion Ctn12. Because it is appropriate that the switch Ms12 is turned on and at least one of the switch Mn12 and Mc is turned off when transferring the first signal to the holding portion Cts12, and that the switch Ms12 is turned off and both of the switch Mn12 and Mc are turned on when transferring the second signal to the holding portion Ctn12.

As described above, according to the first embodiment, when the image quality is important, the readout circuit is switched to operate in the second mode (high-quality readout mode). Optical and noise signals are transferred via the same buffer amplifier, it is possible to cancel a buffer amplifier offset contained both in the optical and noise signals. The first embodiment can, therefore, suppress generation of streak noise which impairs an image. That is, the first embodiment can cancel the difference of the parasitic capacitance arising from the layout difference, and variations of the amplifier offset and gain due to manufacturing variations, which lead to output variations between columns. In the second mode, a high-quality image in which the streak noise is reduced can be obtained at the readout speed which is lower than that in the first mode. Hence, when the image quality is important, the first embodiment can reduce noise in an image obtained from an image signal. The image quality becomes important when, for example, shooting a still image.

In addition, in the second mode, supply of a bias voltage to the noise signal buffer amplifier in the readout circuit stops. The noise signal buffer amplifier does not unnecessarily operate (i.e. an buffer amplifier which is not used for transferring signals stops), suppressing unwanted power consumption of circuit.

When the readout speed is important as in movie shooting, the readout circuit is switched to operate in the first mode (high-speed readout mode). Noise and optical signals are transferred via different buffer amplifiers on multiplexed readout paths, reading them out at high speed. That is, when the readout speed is important, the first embodiment can shorten the period (total readout period) until the photoelectric conversion apparatus outputs an image signal after sensing an image.

Further, a common circuit is usable as a readout circuit for the high-speed operation mode serving as the first mode and that for the high-quality operation mode serving as the second mode. The first embodiment can therefore provide a photoelectric conversion apparatus configured to selectively operate in the high-speed operation mode and noise reduction mode while suppressing an increase in circuit scale of the photoelectric conversion apparatus 100.

Figure 9:
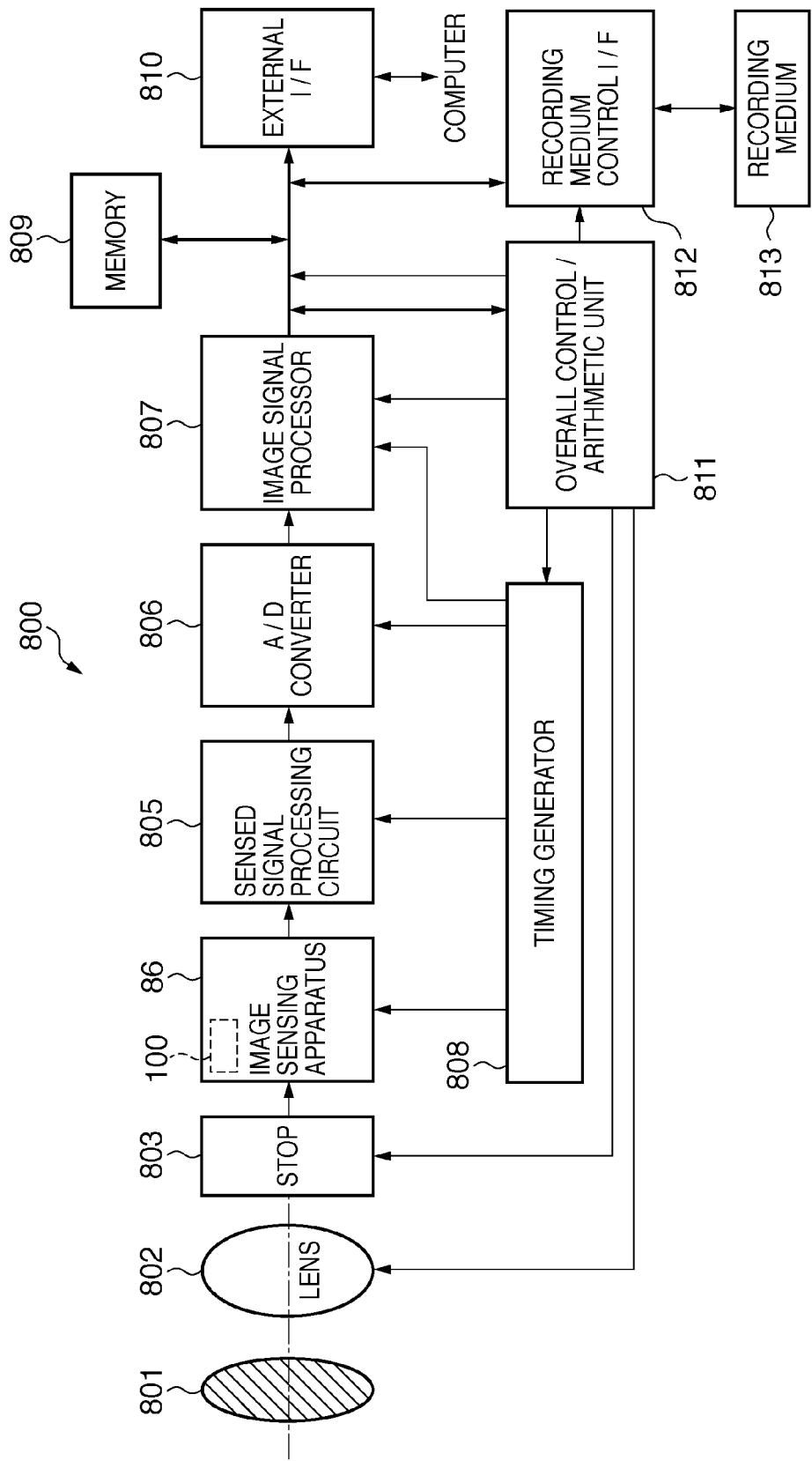
FIG. 9 is a block diagram of the configuration of an imaging system using the photoelectric conversion apparatus 100 according to the first embodiment of the present invention.

FIG. 9 shows an example of an imaging system to which the photoelectric conversion apparatus 100 of the present invention is applied.

As shown in FIG. 9, an imaging system 800 mainly includes an optical system, image sensing apparatus 86, and signal processing unit. The optical system mainly includes a shutter 801, lens 802, and stop 803. The signal processing unit mainly includes a sensed signal processing circuit 805, an A/D converter 806, an image signal processor 807, a memory 809, an external I/F 810, the timing generator 808, the overall control/arithmetic unit 811, a recording medium 813, and a recording medium control I/F 812. The signal processing unit may not include the recording medium 813.

The shutter 801 is arranged in front of the lens 802 on the optical path to control the exposure.

The lens 802 refracts incident light to form an object image on the pixel array 106 (image sensing surface) of the photoelectric conversion apparatus 100 of the image sensing apparatus 86. Alternatively, the lens 802 refracts incident light to guide the light reflected by an object to the pixel array (image sensing surface) of the photoelectric conversion apparatus 100 of the image sensing apparatus 86.

The stop 803 is interposed between the lens 802 and the photoelectric conversion apparatus 100 on the optical path. The stop 803 adjusts the quantity of light guided to the photoelectric conversion apparatus 100 after passing through the lens 802.

The photoelectric conversion apparatus 100 of the image sensing apparatus 86 converts an object image (or light reflected by an object) formed on the pixel array 106 into an image signal. The image sensing apparatus 86 reads out the image signal from the photoelectric conversion apparatus 100, and outputs it.

The sensed signal processing circuit 805 is connected to the image sensing apparatus 86, and processes an image signal output from the image sensing apparatus 86.

The A/D converter 806 is connected to the sensed signal processing circuit 805. The A/D converter 806 converts a processed analog image signal output from the sensed signal processing circuit 805 into a digital signal.

The image signal processor 807 is connected to the A/D converter 806. The image signal processor 807 performs various arithmetic processes such as correction for a digital image signal output from the A/D converter 806, generating image data. The image signal processor 807 supplies the image data to the memory 809, external I/F 810, overall control/arithmetic unit 811, recording medium control I/F 812, and the like.

The memory 809 is connected to the image signal processor 807, and stores image data output from the image signal processor 807.

The external I/F 810 is connected to the image signal processor 807. Image data output from the image signal processor 807 is transferred to an external device (e.g., personal computer) via the external I/F 810.

The timing generator 808 is connected to the image sensing apparatus 86, sensed signal processing circuit 805, A/D converter 806, and image signal processor 807. The timing generator 808 supplies timing signals to the image sensing apparatus 86, sensed signal processing circuit 805, A/D converter 806, and image signal processor 807. The image sensing apparatus 86, sensed signal processing circuit 805, A/D converter 806, and image signal processor 807 operate in synchronism with the timing signals.

The overall control/arithmetic unit 811 is connected to the timing generator 808, image signal processor 807, and recording medium control I/F 812, and controls all of them.

The recording medium 813 is detachably connected to the recording medium control I/F 812. Image data output from the image signal processor 807 is recorded on the recording medium 813 via the recording medium control I/F 812.

With this arrangement, the photoelectric conversion apparatus 100 can provide a high-quality image (image data) as long as it can obtain a high-quality image signal.

A photoelectric conversion apparatus 100i according to the second embodiment of the present invention will be described. A difference from the first embodiment will be mainly explained.

A readout circuit 101i in the photoelectric conversion apparatus 100i is different from that in the first embodiment in that it includes a readout circuit control unit 200i and holding block HBi, as shown in FIG. 10. The holding block HBi includes an amplification unit 201i and first storage unit 203i. FIG. 10 is a circuit diagram showing the circuit arrangement of the readout circuit 101i for one column in the second embodiment of the present invention.

The readout circuit control unit 200i further controls the amplification unit 201i and first storage unit 203i.

The first storage unit 203i further includes a CTS connection unit M1s serving as the 10th switch and a CTN connection unit M1n serving as the 11th switch.

The CTS connection unit M1s connects/disconnects an optical signal holding portion Cts11 to/from a line L1 connecting an optical signal opening/closing portion Ms11 and optical signal buffer amplifier AM1s. The CTS connection unit M1s is, for example, an NMOS transistor, and receives at its gate the inverted signal of a signal φMODE supplied from the readout circuit control unit 200i. The CTS connection unit M1s electrically connects the line L1 to optical signal holding portion Cts11 in the first mode, and electrically disconnects the line L1 from the optical signal holding portion Cts11 in the second mode.

The CTN connection unit M1n connects/disconnects a noise signal holding portion Ctn11 to/from a line L2 connecting a noise signal opening/closing portion Mn11 and noise signal buffer amplifier AM1n. The CTN connection unit M1n is, for example, an NMOS transistor, and receives at its gate the inverted signal of the signal φMODE supplied from the readout circuit control unit 200i. The CTN connection unit M1n electrically connects the line L2 to noise signal holding portion Ctn11 in the first mode, and electrically disconnects the line L2 from the noise signal holding portion Ctn11 in the second mode.

Figure 11A:
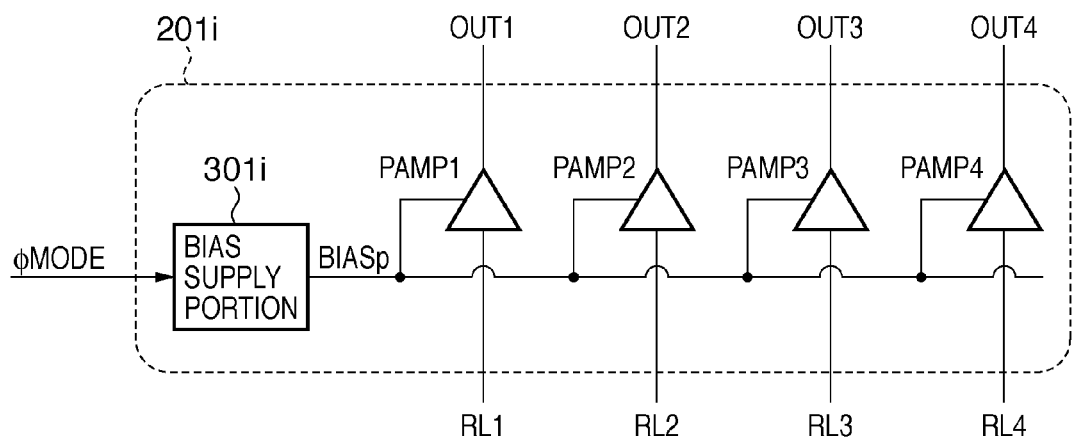
FIGS. 11A to 11C are circuit diagrams showing the structure of an amplification unit 201$i$.
Figure 11B:
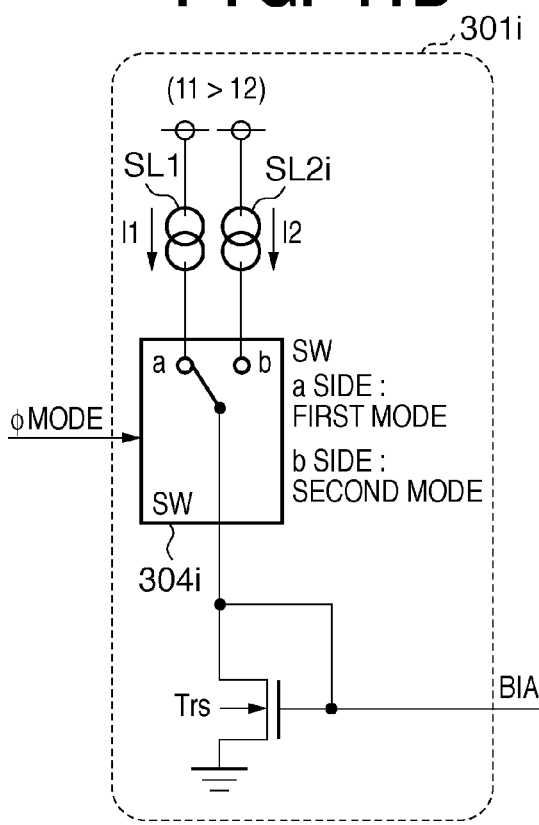
Figure 11C:
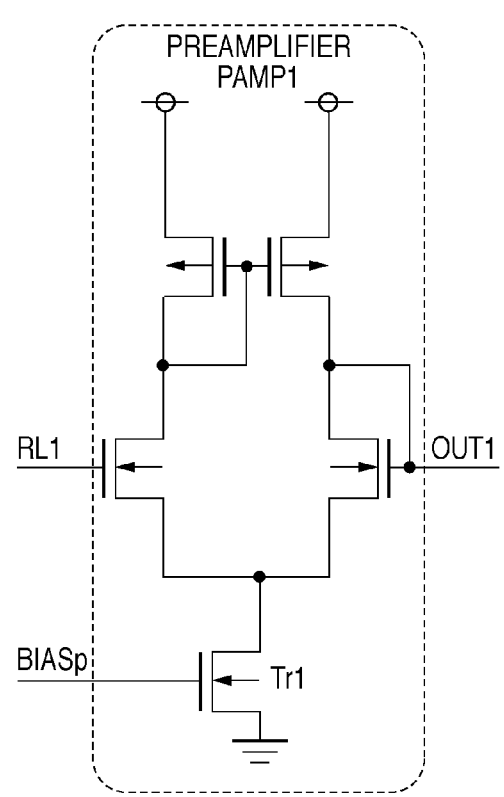

The structure of the amplification unit 201i will be explained with reference to FIGS. 11A to 11C. FIGS. 11A to 11C are circuit diagrams showing the structure of the amplification unit 201i.

As shown in FIG. 11A, the amplification unit 201i includes a bias supply portion 301i serving as the second supply unit.

As shown in FIG. 11B, the bias supply portion 301i includes a current source load SL2i and current switch 304i. In the first mode in which the signal φMODE is at Lo, the current switch 304i is switched to a terminal a to supply a current I1 from a current source load SL1 to the drain of a transistor Trs. The transistor Trs has a drain and gate both of which are short-circuited, and outputs the first bias voltage corresponding to the current I1 from its gate (terminal BIASp). In the second mode in which the signal φMODE is at Hi, the current switch 304i is switched to a terminal b to supply a current I2 smaller than the current I1 from the current source load SL2i to the drain of the transistor Trs. The transistor Trs outputs the second bias voltage corresponding to the current I2 from its gate (terminal BIASp). The second bias voltage is lower than the first one.

As shown in FIG. 11C, a preamplifier PAMP1 amplifies a signal, which is input to its non-inverting input terminal via a column signal line RL1, at the first amplification factor corresponding to the first bias voltage in the first mode. The preamplifier PAMP1 amplifies a signal input to its non-inverting input terminal at the second amplification factor corresponding to the second bias voltage in the second mode. The second amplification factor is smaller than the first one. The preamplifier PAMP1 outputs the amplified signal to an output node OUT1.

In the second mode in which the signal φMODE is at Hi level, the optical signal holding portion Cts11 is disconnected from the line L1 which is connected to the output node OUT1 of the preamplifier PAMP1. As a result, the time constant for the line L1 which is connected to the output node OUT1 of the preamplifier PAMP1 becomes smaller than that in the first mode by the capacitance of the optical signal holding portion Cts11, suppressing the driving current of the preamplifier PAMP1. In the second embodiment, power consumption can be suppressed by amount according to (I1−I2)×4 columns in the second mode, compared to the first mode.

A photoelectric conversion apparatus 100j according to the third embodiment of the present invention will be described. A difference from the first and second embodiments will be mainly explained.

A readout circuit 101j in the photoelectric conversion apparatus 100j is different from those in the first and second embodiments in that it includes a readout circuit control unit 200j and holding block HBj, as shown in FIG. 12. The holding block HBj includes a connection unit 205j. FIG. 12 is a circuit diagram showing the circuit arrangement of the readout circuit 101j for one column in the third embodiment of the present invention.

The readout circuit control unit 200j controls the connection unit 205j.

The connection unit 205j includes a connection switch Mn14 serving as the sixth switch and a connection switch Ms14 serving as the seventh switch. The connection switch Mn14 connects/disconnects a first node N1 to/from a third node N3. The third node N3 is a node between a noise signal opening/closing portion Mn12 serving as the fourth switch and a noise signal holding portion Ctn12 serving as the fourth holding unit. The connection switch Ms14 connects/disconnects a second node N2 to/from a fourth node N4. The fourth node N4 is a node between an optical signal opening/closing portion Ms12 serving as the second switch and an optical signal holding portion Cts12 serving as the second holding unit.

The connection switches Mn14 and Ms14 have almost the same electrical characteristics. This structure can reduce the differences in parasitic resistance and parasitic capacitance between the optical signal path and the noise signal path in the second mode.

The readout circuit control unit 200j controls the connection unit 205j in accordance with a signal φMODE supplied from a mode switching unit 103. For example, for control in the first mode (in a case where signal φMODE=Lo), the readout circuit control unit 200j maintains the connection switches Mn14 and Ms14 in the open state (OFF state). For example, for control in the second mode (in a case where signal φMODE=Hi), the readout circuit control unit 200j maintains at least one of the connection switch Mn14 and Ms14 in the closed state (ON state).

Figure 13:
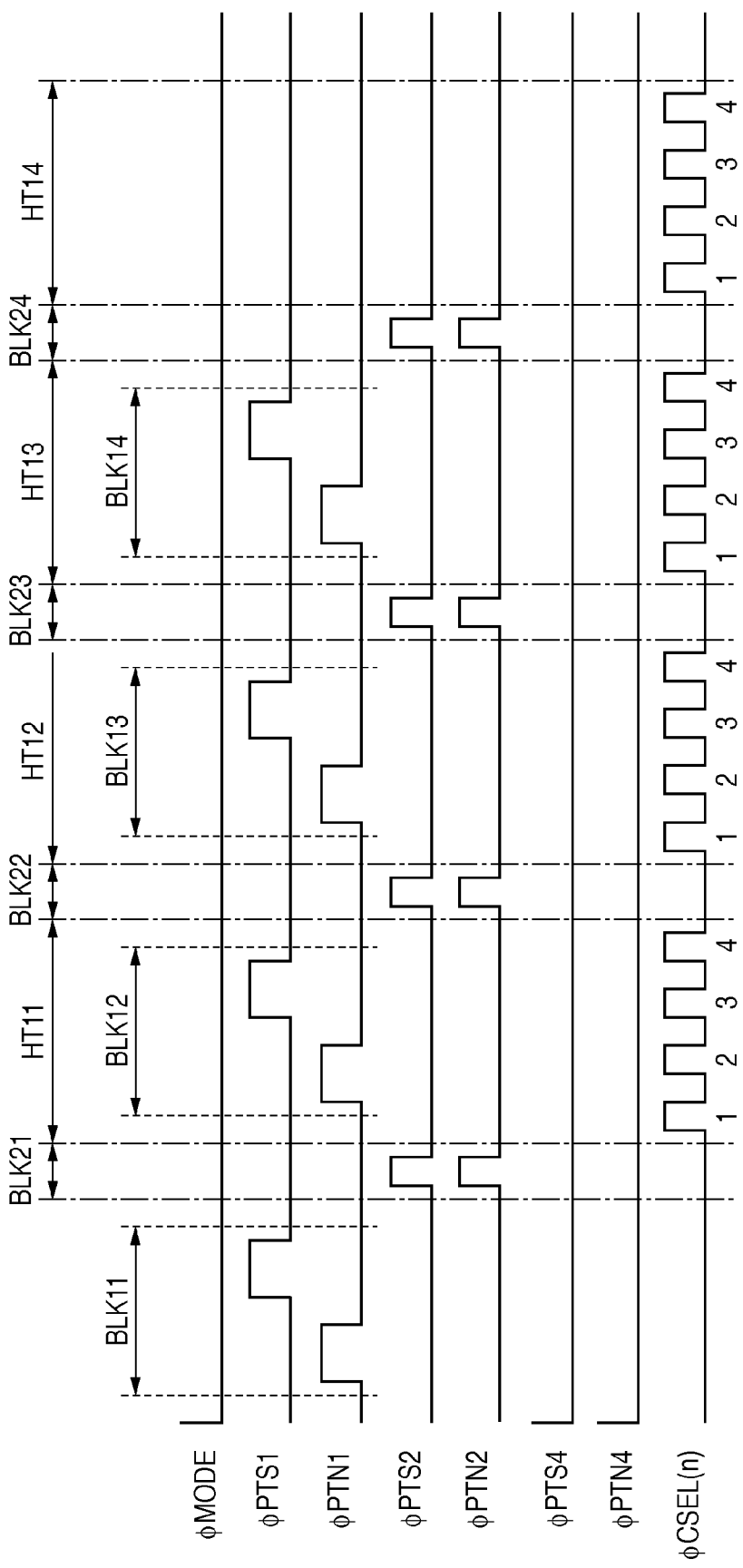
FIG. 13 is a timing chart showing the operation of the readout circuit in the first mode.

More specifically, the operation of the readout circuit 101j is different from those in the first and second embodiments in the following points as shown in FIGS. 13 and 14.

FIG. 13 is a timing chart showing the operation of the readout circuit in the first mode (high-speed readout mode).

The mode switching unit 103 switches to the first mode by changing the signal φMODE to be supplied to the readout circuit control unit 200j to Lo level. The readout circuit control unit 200j generates driving pulses φPTN4 and φPTS4 corresponding to the first mode for the connection unit 205j.

The readout circuit control unit 200j supplies the driving pulse φPTN4 a signal level of which is maintained at Lo level to the connection switch Mn14. In response to this, the connection switch Mn14 is maintained in the open state (OFF state).

The readout circuit control unit 200j supplies the driving pulse φPTS4, a signal level of which is maintained at Lo level, to the connection switch Ms14. In response to this, the connection switch Ms14 is maintained in the open state (OFF state).

FIG. 14 is a timing chart showing the operation of the readout circuit in the second mode (high-quality readout mode).

The mode switching unit 103 switches to the second mode by changing the signal φMODE to be supplied to the readout circuit control unit 200j to Hi level. The readout circuit control unit 200j generates driving pulses φPTN4 and φPTS4 corresponding to the second mode for the connection unit 205j.

The readout circuit control unit 200j supplies the driving pulse φPTS4, a signal level of which is maintained at Lo level, to the connection switch Mn14. In response to this, the connection switch Mn14 is maintained in the open state (OFF state). The readout circuit control unit 200j maintains a signal φPTS2 at Lo level.

While the signal φPTN4 becomes active in a period BLK1, the connection switch Mn14 is turned on to transfer a noise signal, which has been output from a first pixel A11 to a column signal line RL1, via an amplification unit 201i and an optical signal buffer amplifier AM1s into the noise signal holding portion Ctn12 to store the noise signal in the noise signal holding portion Ctn12. The noise signal contains, for example, an offset component unique to a pixel shown in FIG. 2, and random noise generated when a reset transistor 25 is turned on to reset an FD 7.

Similar to the first embodiment, while a signal φPTS2 becomes active in the period BLK1, an opening/closing portion Ms12 is turned on to transfer an optical signal, which has been output from the first pixel A11 to the column signal line RL1, via the amplification unit 201i and optical signal buffer amplifier AM1s into the optical signal holding portion Cts12 to store the optical signal in the optical signal holding portion Cts12. The above-mentioned noise signal is superimposed to the optical signal held in the holding portion Cts12.

The parasitic capacitance and parasitic resistance can be made equivalent between the optical signal path and the noise signal path by giving the same electrical characteristics to the connection switch Mn14, connection switch Ms14, optical signal opening/closing portion Ms12, and noise signal opening/closing portion Mn12. Further, noise generated in the readout path can be easily reduced by equalizing the capacitances of the optical signal holding portion Cts12 and noise signal holding portion Ctn12.

As shown in FIGS. 13 and 14, the connection switch Ms14 does not perform an opening/closing operation both in first mode and second mode. Thus, the connection switch Ms14 is not a necessary element for the circuit operation. However, the connection switch Ms14 is necessary to keep the optical signal path and noise signal path symmetrical. This is because the symmetry reduces the difference in parasitic capacitance between the optical signal path and the noise signal path.

It is also possible to use the connection switch Ms14 (i.e. turn on the connection switch Ms14 instead of the connection switch Mn14) and not to use the connection switch Mn14 (i.e. maintain the connection switch Mn14 turned off) by changing the signal φPTS1 to be maintained at Lo level and the signal φPTN1 to be maintained at Hi level in the second mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-181986, filed Jul. 11, 2008, which is hereby incorporated by reference herein in its entirety.

What is claimed is:

1. A photoelectric conversion apparatus comprising:
   a plurality of pixels each including a photoelectric conversion unit;
   a signal line which is connected to the plurality of pixels;
   a holding block which, while a readout pixel is selected from the plurality of pixels, temporarily holds a first signal and a second signal output from the readout pixel to the signal line at different timings;
   an output unit which generates an image signal by calculating a difference between the first signal and the second signal held in the holding block and which outputs the generated image signal; and
   a control unit which controls the holding block,
   wherein the holding block includes a first holding unit, a second holding unit, a third holding unit, a fourth holding unit, a first impedance conversion unit, and a second impedance conversion unit, and
   the control unit selectively operates the holding block in one of a first mode and a second mode, the first mode being a mode in which the first signal is held in the first holding unit and then transferred from the first holding unit to the second holding unit via the first impedance conversion unit, and in which the second signal is held in the third holding unit and then transferred from the third holding unit to the fourth holding unit via the second impedance conversion unit, and the second mode being a mode in which the first signal is transferred to the second holding unit via the first impedance conversion unit and the second signal is transferred to the fourth holding unit via the first impedance conversion unit.

2. The apparatus according to claim 1, wherein the holding block further includes
   a first switch which connects/disconnects the signal line to/from the first holding unit,
   a second switch which connects/disconnects the first impedance conversion unit to/from the second holding unit,
   a third switch which connects/disconnects the signal line to/from the third holding unit, a fourth switch which connects/disconnects the second impedance conversion unit to/from the fourth holding unit, and a fifth switch which connects/disconnects a first node to/from a second node, the first node being a node between the first impedance conversion unit and the second switch, and the second node being a node between the second impedance conversion unit and the fourth switch, and wherein the control unit controls, when controlling the holding block in the first mode, to maintain the fifth switch in an OFF state, and controls, when controlling the holding block in the second mode, to turn on the second switch and to turn off at least one of the fourth switch and the fifth switch for transferring the first signal to the second holding unit, and to turn on the fourth switch and the fifth switch and to turn off the second switch for transferring the second signal to the fourth holding unit.

3. The apparatus according to claim 2, further comprising:
a first output line which transfers the first signal from the holding block to the output unit; and
a second output line which transfers the second signal from the holding block to the output unit.

4. The apparatus according to claim 2, wherein
the holding block further includes
a tenth switch which connects/disconnects the first holding unit to/from a line which connecting the first switch to the first impedance conversion unit, and
an eleventh switch which connects/disconnects the third holding unit to/from a line connecting the third switch to the second impedance conversion unit.

5. The apparatus according to claim 1, wherein
the holding block further includes
a first switch which connects/disconnects the signal line to/from the first holding unit;
a second switch which connects/disconnects the first impedance conversion unit to/from the second holding unit;
a third switch which connects/disconnects the signal line to/from the third holding unit;
a fourth switch which connects/disconnects the second impedance conversion unit to/from the fourth holding unit;
a sixth switch which connects/disconnects a first node to/from a third node, the first node being a node between the first impedance conversion unit and the second switch, and the third node being a node between the fourth switch and the fourth holding unit; and
a seventh switch which connects/disconnects a second node between the second impedance conversion unit and the fourth switch and a fourth node between the second switch and the second holding unit, wherein the control unit controls, when controlling the holding block in the first mode, to maintain the sixth switch and the seventh switch in an OFF state, and controls, when controlling the holding block in the second mode, to selectively turn on the second switch and the sixth switch and to turn off both the fourth switch and the seventh switch.

6. The apparatus according to claim 1, wherein
the holding block further includes a first supply unit which supplies a bias voltage to the second impedance conversion unit, and
the control unit controls the first supply unit to supply the bias voltage to the second impedance conversion unit in the first mode, and controls the first supply unit not to supply the bias voltage to the second impedance conversion unit in the second mode.

7. The apparatus according to claim 1, wherein
the holding block further includes an amplification unit having an input terminal connected to the signal line and an output terminal connected both to the first switch and the second switch.

8. The apparatus according to claim 7, wherein
the holding block further includes a second supply unit which supplies a bias voltage to the amplification unit, and
the control unit controls the second supply unit to supply a first bias voltage to the amplification unit in the first mode, and controls the second supply unit to supply a second bias voltage lower than the first bias voltage to the amplification unit in the second mode.

9. An imaging system comprising:
a photoelectric conversion apparatus defined in claim 1;
an optical system which guides light to a pixel array of the photoelectric conversion apparatus; and
a signal processing unit which processes a signal output from the photoelectric conversion apparatus to generate image data.

* * * * *